Figure 1:
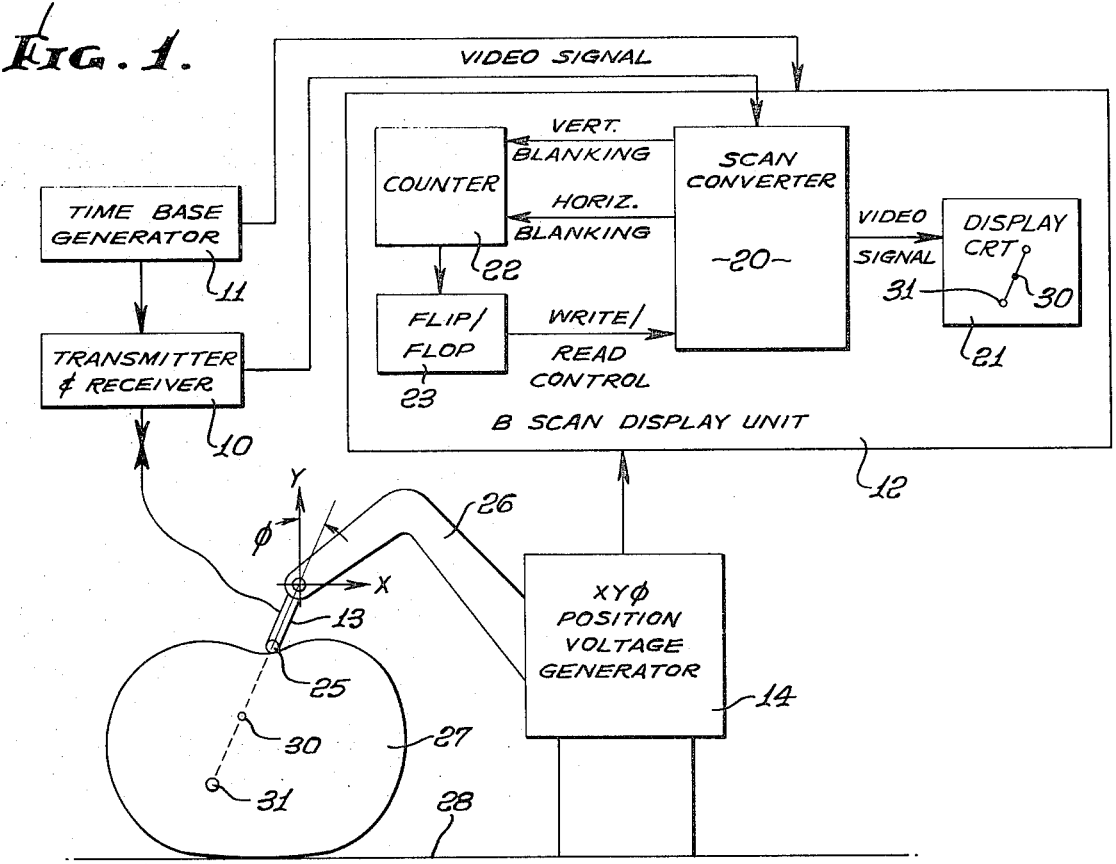

United States Patent [19]
Ranalli et al.

[11] 3,864,660
[45] Feb. 4, 1975

[54] ULTRASCOPE

[75] Inventors: Ralph Ranalli, Anaheim; Kenneth R. Torrence, Santa Ana, both of Calif.

[73] Assignee: Rohe' Scientific Corporation, Santa Ana, Calif.

[22] Filed: Sept. 10, 1973

[21] Appl. No.: 395,427

[52] U.S. Cl. ............... 340/1 R, 73/67.7, 340/3 C, 343/5 SC
[51] Int. Cl. ........................... G01s 7/56, G01s 7/62
[58] Field of Search ......... 340/1 R, 3 C, 3 R, 5 MP; 343/5 SC; 73/67.6, 67.7, 67.8 R, 67.8 S, 67.9

[56] References Cited
UNITED STATES PATENTS
3,218,637  11/1965  Balding ............................ 340/3 C Primary Examiner—Richard A. Farley
Attorney, Agent, or Firm—Harris, Kern, Wallen & Tinsley

[57] ABSTRACT

An improved ultrasonic system of the pulse-echo type for medical diagnosis and the like. An ultrasonic system with transmitter, ultrasonic transducer, receiver and display unit, with a scan converter in the display unit for picture storage and readout by conventional TV sweep patterns and presentation on a conventional TV monitor. A write-read selection system providing a write mode with a high rate of data entry, such as more than one thousand ultrasonic pulses per second with present day 525 line 60 hertz TV displays.

4 Claims, 3 Drawing Figures

ULTRASCOPE

This invention relates to ultrasonic systems of the pulse echo type which are particularly suited for use in medical diagnosis. Ultrasonic systems are in use today and serve as an excellent tool in obtaining graphic displays of body internal configuration. A conventional system includes a transmitter, an ultrasonic transducer, a receiver, and a display unit.

In use, the transducer is positioned at the skin, the transmitter provides an electrical pulse to the transducer which in turn launches an ultrasonic pulse into the body. The echos produced by various discontinuities in the body are picked up by the transducer, converted to electrical signals and sent to the receiver which in turn provides signals to the display unit.

The transducer may be moved along the surface of the body and the angle of orientation of the transducer may be changed to scan a complete section through the body, with the resultant display having something of the appearance of an X-ray picture.

A scan converter is utilized in the display unit for receiving and storing the incoming data from the receiver while in a write mode, and for providing a video signal to the TV monitor tube during a read mode. Scan converters are used to store TV pictures having one line rate and frame rate and to provide a readout of the picture at another line and/or frame rate. Scan converters are also used where the data entry or writing is in a random manner, with readout by normal TV sweep on a TV monitor. The video signal from the receiver of the ultrasonic system referred to above provides a random entry of data to the scan converter, with the data then being readout for display at a standard line and frame rate, usually that corresponding to the TV system in use in the country, permitting use of standard TV monitors.

In the conventional ultrasonic system which gives the appearance to the viewer of continuous real time operation, data is written or stored only during the vertical retrace blanking time interval of the TV sweep pattern. Hence data is written or entered only 60 times per second during approximately a 1 millisecond interval per entry. This data entry rate is well below that desired in medical ultrasonic systems, where a data rate in the order of 30 to 1000 ultrasonic pulses per second is sought. The low data rate of the conventional system is a particular problem in cardiac time motion diagrams which must display the rapid movements of the mitral valve leaflets. Discontinuous time motion lines result when operating at 60 ultrasonic pulses per second.

The present invention is an improvement on the conventional ultrasonic system and provides a much higher data entry rate permitting a much higher ultrasonic pulse rate, typically in the range of 700 to 1100 ultrasonic pulses per second. The present invention includes a modification for the conventional display unit resulting in an increase in the time available for writing while retaining the conventional TV sweep rate for display on a standard TV monitor. In the preferred embodiment disclosed herein, half of the operating time is available for data writing providing the high data entry rate desired for more detailed medical diagnosis.

Other advantages, features and results will more fully appear in the course of the following description. The drawing merely shows and the description merely describes a preferred embodiment of the present invention which is given by way of illustration or example.

Figure 2:
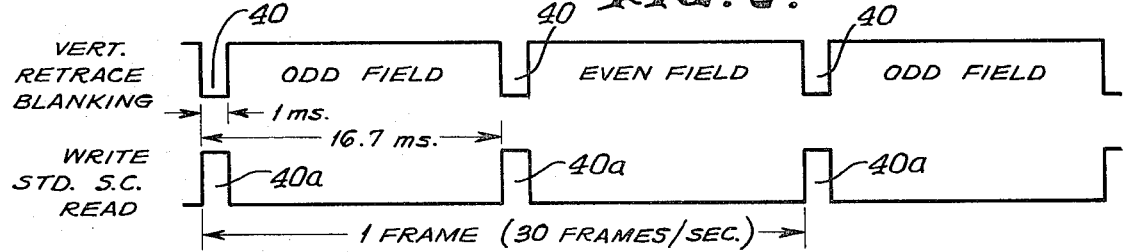
Figure 3:
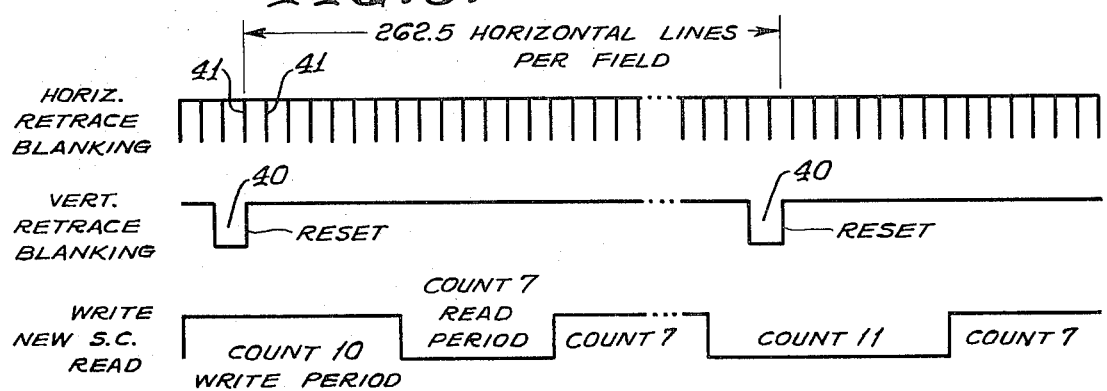

In the drawing:

FIG. 1 is a block diagram of an ultrasonic system incorporating the presently preferred embodiment of the invention; and FIGS. 2 and 3 are timing diagrams illustrating the operation of the system of FIG. 1.

The ultrasonic system of FIG. 1 includes a transmitter and receiver 10, a time base generator 11, a display unit 12, an ultrasonic transducer 13, and a position voltage generator 14. The display unit 12 includes a scan converter 20, a display cathode ray tube 21, a counter 22, and flip flop 23,. All of these components except the counter 22 and flip flop 23 are found in the conventional ultrasonic system presently in use for medical diagnosis.

In operation, an electricl pulse from the transmitter is connected to the transducer 13 where it is converted to an ultrasonic pulse radiated from the end 25 of the transducer. The transducer is carried on an arm 26 of the position voltage generator 14. The transducer is moved over the body 27 which may rest on a table or other support 28, with the operator moving the transducer in the $x$ and $y$ directions and also pivoting the transducer with respect to the arm 26, with the pivoting angle $\phi$.

Echos are generated by the surface of the body 27 and by discontinuities within the body, as indicated by the dots 30, 31. The echos are picked up by the transducer, converted to electrical signals, and connected to the receiver for subsequent transmission to the scan converter of the display unit. The echo pulse information is written or stored in the scan converter with the position being determined by the position voltages from the generator 14, all in the conventional manner. This information storage takes place during the write mode of operation of the scan converter. During the read mode of operation, the stored image is read by a conventional TV sweep and displayed on a conventional TV monitor such as the tube 21. In the illustration of FIG. 1, the echos from a single pulse are illustrated in the body 27 and in the tube 31. However in actual use, a large number of ultrasonic pulses from a large number of positions and angles are utilized to provide a complete picture of the body being analyzed.

In the television system presently used in the United States, there is a picture frame every thirtieth of a second, resulting in 30 frames per second. The frame is divided into two interlaced fields referred to as the odd field and the even field. Each frame comprises 525 horizontal lines or traces, or 262 ½ lines per field. In operation, the electron beam of the picture tube moves from left to right producing a line of the picture. Before the next line of the image is formed, the beam sweep is retraced from the right edge to the left edge, with beam itself blanked or shut off, and the next horizontal line is produced at a position below the preceding line. This horizontal sweeping continues to the bottom of the field. The beam position is then moved from the bottom of the field to the top of the field in the vertical retracing operation, with the beam being blanked or shut off. The display unit develops a vertical retrace blanking signal or pulse at the end of each field and develops a horizontal retrace blanking signal or pulse at the end of each line. This operation is illustrated in the timing diagrams of FIGS. 2 and 3. The beam is blanked during each vertical retrace blanking pulse 40 and during each horizontal blanking pulse 41. In the conventional ultrasonic system, the scan converter is operated in the standard mode with the writing or data entry occurring during the vertical retrace blanking, i.e., during the periods 40a as indicated in FIG. 2. Vertical retrace blanking occurs 60 times per second and the blanking pulse has a duration of about 1 millisecond, thereby limiting the ultrasonic pulse rate to 60 pulses per second and limiting the time in which echos can be received and recorded to 1 millisecond.

In the system of the present invention, the horizontal blanking pulses 41 are connected as inputs to the counter 22. Each time the counter counts a predetermined number of the horizontal blanking pulses, the counter provides an output to the flip flop 23. In the example given herein, the counter 22 provides an output to the flip flop 23 for every 7 horizontal blanking pulses 41. The flip flop 23 provides a control for the mode selection of the scan converter, switching the scan converter from the write mode to the read mode and back to the write mode with a switching operation taking place for each change in state of the flip flop. Hence the scan converter will be in the write or data entry mode for 7 lines of the sweep and then in the read or display mode for 7 lines, as illustrated in the last line of FIG. 3.

In the preferred embodiment illustrated, the vertical blanking pulse 40 is used to reset the counter to zero at the end of a field. This provides for synchronization of registration of the writing and reading for the odd and even fields when the number of lines per field is not an exact multiple of the number of counts per mode change.

With odd and even fields in the display sweep pattern, it is desirable to have an odd number of mode changes per field so that one field starts in the write mode and the next field starts in the read mode, resulting in one field having seven missing lines alternating with seven retained lines, and the next field having a complementary pattern. There is an increase in flicker in the picture tube display over that encountered with a conventional TV display. However this is readily overcome by using a longer persistence phosphor in the picture tube.

For the specific embodiment given herein with the 525 line 60 hertz TV system and the counter providing an output for every seven input pulses, the transducer may be operated 1,110 ultrasonic pulses per second without loss of data, while obtaining a real time presentation of the data to the operator.

While a specific set of numbers have been used in the preceding example it will be understood that the invention is readily usable with any line rate and frame rate and that counters other than seven may be used with the counter. Also, the invention has been described in combination with a conventional TV display having a horizontal line sweep, but is equally applicable to a system with a vertical line sweep.

We claim:

1. An ultrasonic system having transmitter, ultrasonic transducer, receiver and display unit,
   said display unit including a display screen with a sweep pattern and a scan converter with mode selection means for selecting separate write and read modes for the converter;
   timing means for determining write mode periods and read mode periods each of a duration a portion of the sweep pattern duration;
   means for synchronizing said timing means with said sweep pattern; and
   means for controlling said mode selection means as a function of said timing means providing write and read modes at separate times in said scan converter corresponding to said write and read periods.

2. In an ultrasonic system having transmitter, ultrasonic transducer, receiver and display unit, the display unit including a scan converter with means providing horizontal and vertical blanking signals and mode selection means for selecting write and read modes of operation, including in combination:
   counter means;
   switch means switching between write and read states providing write and read signals in response to input signals from said counter means;
   means connecting said horziontal blanking signals to said counter means as an input, with said counter means providing an output to said switch means on counting a predetermined number of horizontal blanking signals; and
   means connecting said switch means to said scan converter mode selection means for changing the scan converter mode from write to read to write corresponding to the state of said switch means.

3. An ultrasonic system as defined in claim 2 wherein said counter means includes means for resetting to a zero count state on receiving a reset signal, and
   including means connecting said vertical blanking signals to said counter means as reset signals.

4. An ultrasonic system as defined in claim 3 wherein said display unit includes means providing first and second fields in each frame, and
   wherein said predetermined number of said counter provides an odd number of switch means state changes per field.

* * * * *

PO-1050
(5/69)

UNITED STATES PATENT OFFICE
CERTIFICATE OF CORRECTION

Patent No. 3,864,660     Dated February 4, 1975

Inventor(s) Ralph Ranalli and Kenneth R. Torrence

It is certified that error appears in the above-identified patent and that said Letters Patent are hereby corrected as shown below:

Column 1, line 45 "30" should be --300--

Signed and sealed this 29th day of April 1975.

(SEAL)
Attest:

RUTH C. MASON
Attesting Officer

C. MARSHALL DANN
Commissioner of Patents
and Trademarks